J. T. GERMAIN.
PLANTER.
APPLICATION FILED FEB. 4, 1920.
1,361,043.
Patented Dec. 7, 1920.
3 SHEETS—SHEET 3.
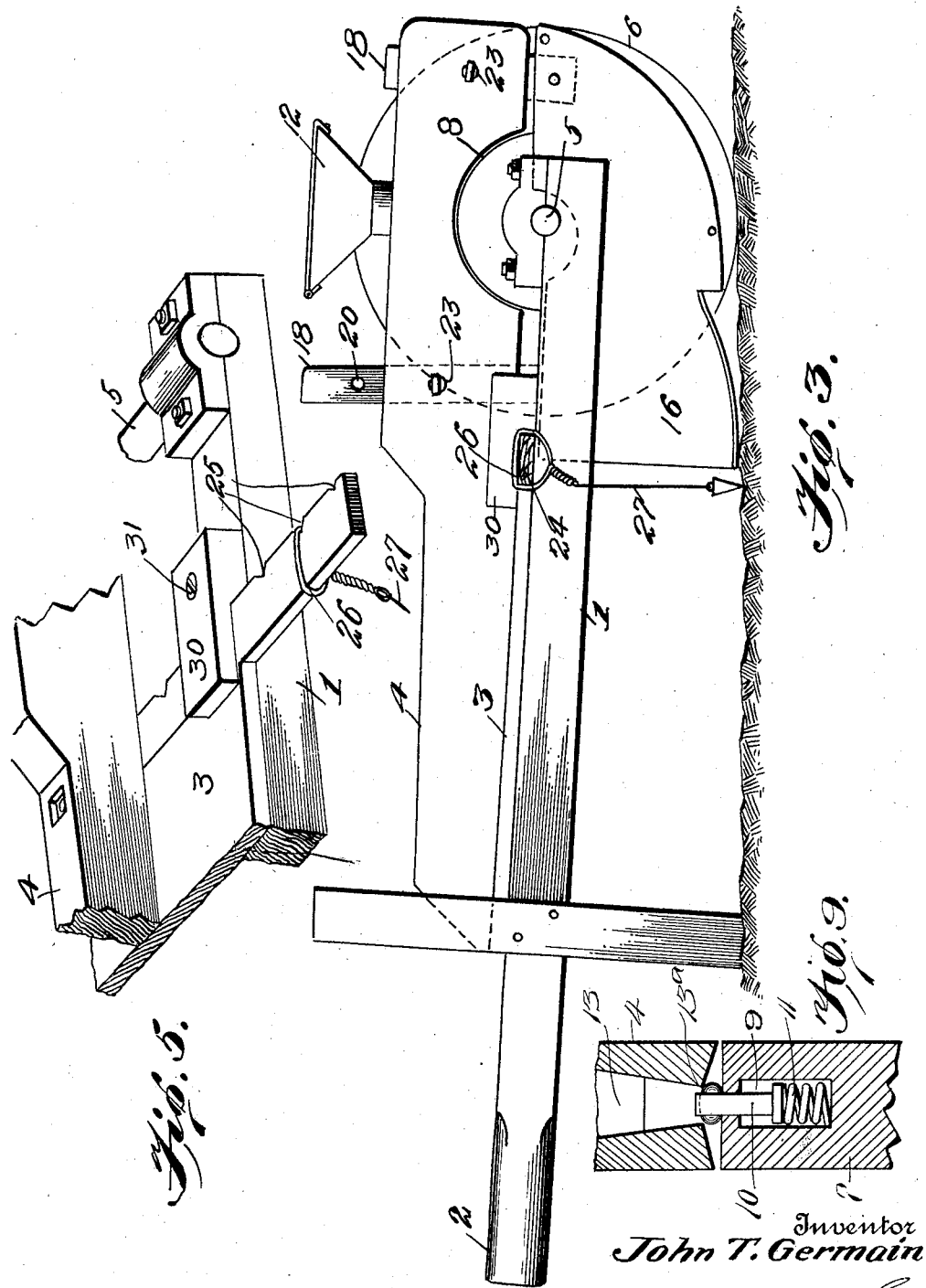
Inventor
John T. Germain.

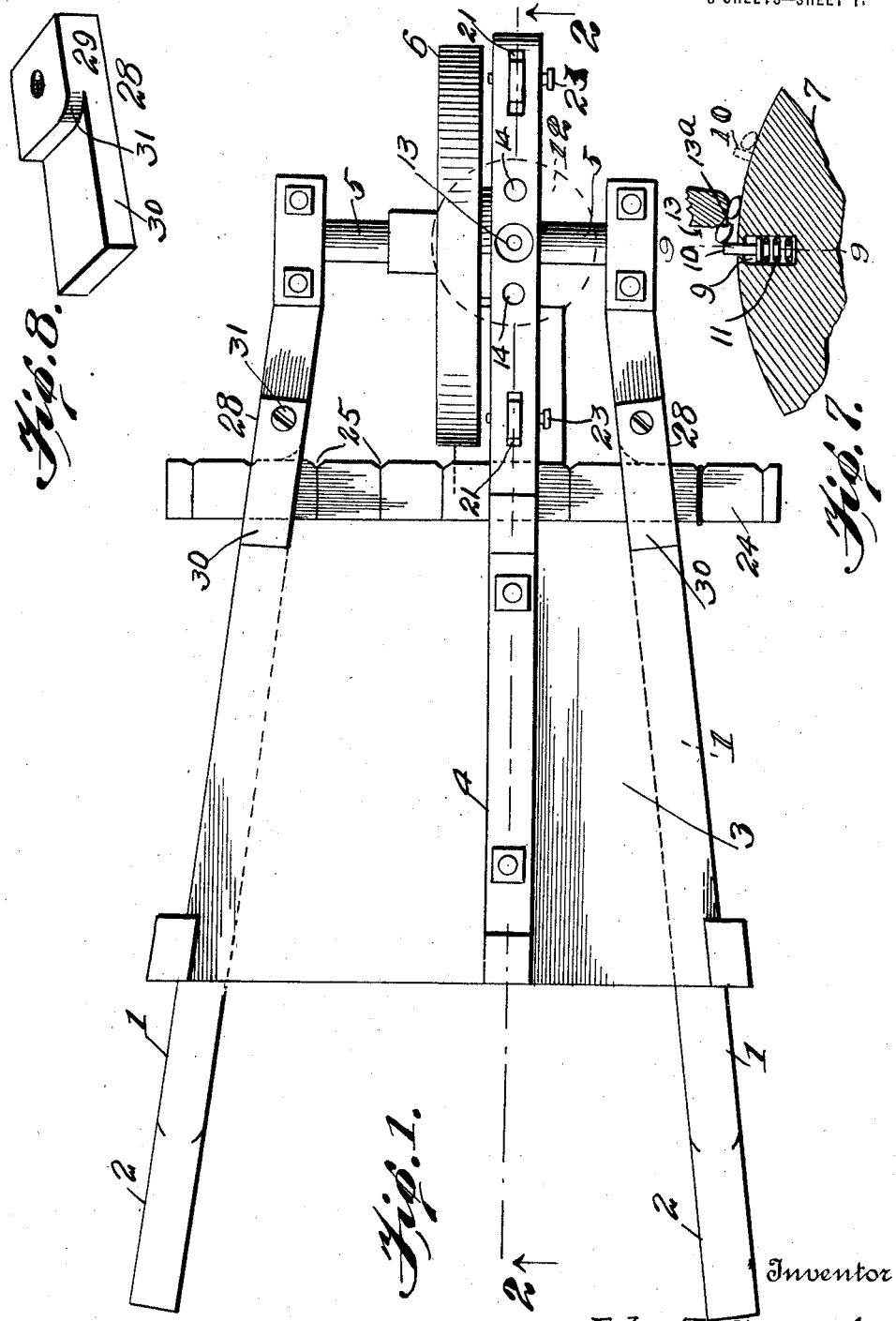

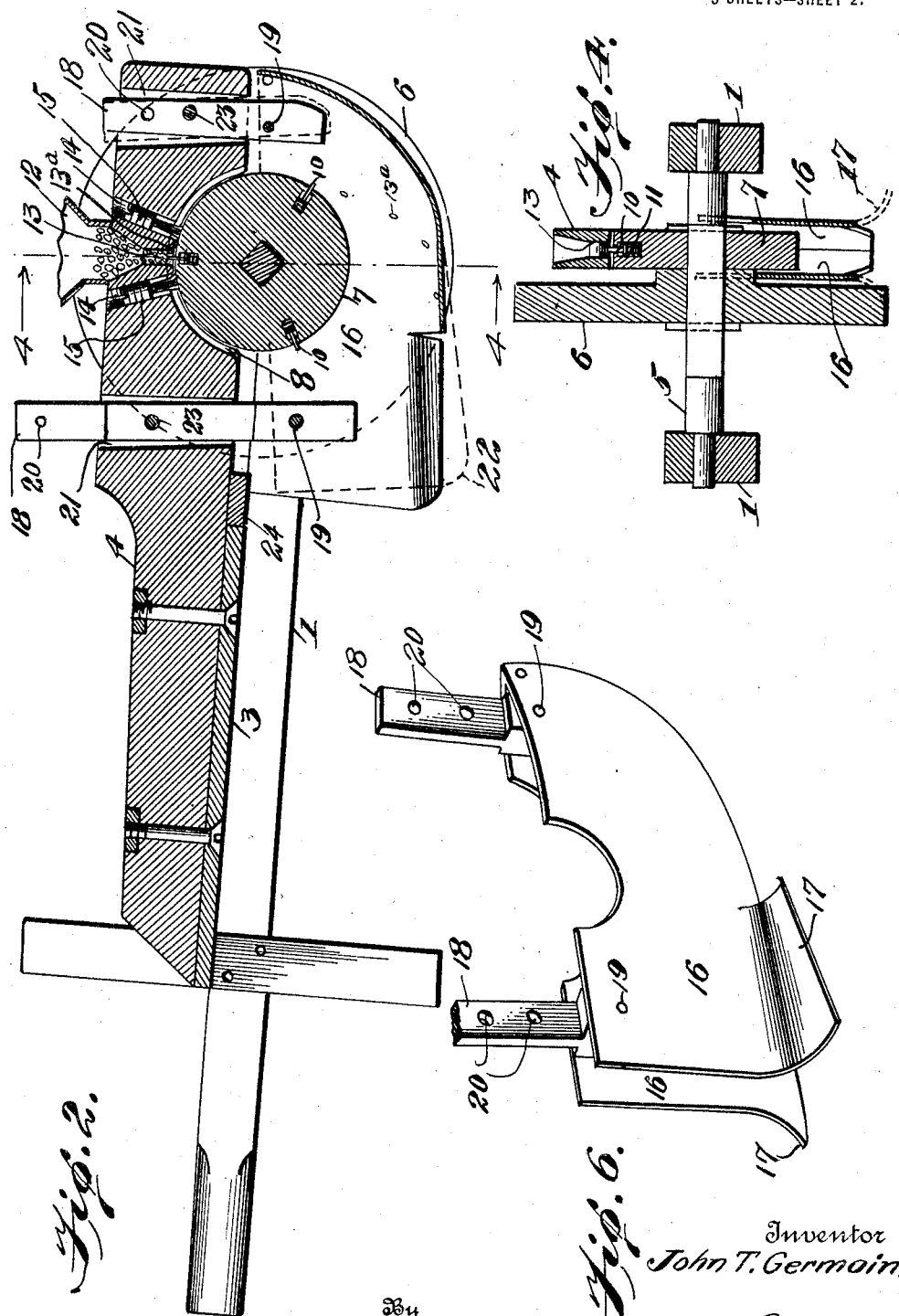

UNITED STATES PATENT OFFICE.

JOHN T. GERMAIN, OF BRAINERD, MINNESOTA.

PLANTER.

1,361,043.

Specification of Letters Patent.

Patented Dec. 7, 1920.

Application filed February 4, 1920. Serial No. 356,172.

*To all whom it may concern:*

Be it known that I, JOHN T. GERMAIN, a subject of the King of England, residing at Brainerd, in the county of Crow Wing and State of Minnesota, have invented certain new and useful Improvements in Planters, of which the following is a specification, reference being had therein to the accompanying drawings.

This invention relates to a planter, and has for its object the improvement of the construction of a planter whereby seed can be efficiently and satisfactorily dropped or planted.

Another object of the invention is the improvement of the construction of the furrow opener, which is adjustably attached to the body of the planter.

With these and other objects in view my invention comprises certain novel combinations, constructions, and arrangements of parts as will be hereinafter fully described, illustrated in the accompanying drawings and more particularly pointed out in the appended claim.

In the drawings:

Figure 1 is a top plan view of a planter constructed in accordance with the present invention.

Fig. 2 is a view taken on line 2—2, Fig. 1, looking in the direction of the arrows.

Fig. 3 is a view inside elevation of my planter.

Fig. 4 is a view taken on line 4—4, Fig. 2, looking in the direction of the arrows.

Fig. 5 is a fragmentary, perspective view of the planter showing the marker bar.

Fig. 6, is a perspective view of the furrow opener device.

Fig. 7, is an enlarged fragmentary, sectional view of the seed disk.

Fig. 8 is a perspective view of the marker-bar locking device.

Fig. 9 is a sectional view taken on line 9—9, Fig. 7, looking in the direction of the arrows.

Referring to the drawings by numerals, 1 designates the side bars of the frame, which bars have their ends 2 formed into grips, whereby the operator can easily grasp the bars for conveying the planter over the ground.

A board 3 is fastened to the side bars 1, and fastened to the board 3, near its center, is a longitudinally extending frame 4.

Suitably journaled upon the front end of the bars is shaft 5, and secured to shaft 5 is the driving wheel 6.

Secured to the shaft 5 is the seed disk 7, which disk is partly positioned in a pocket or socket 8 cut in one edge of the frame 4, Figs. 2 and 3.

The seed disk 7 is provided with a plurality of pockets 9 in which are placed plunger pins 10, which pins are normally forced outward by means of coil springs 11. These pins are adapted to press against a seed or seeds for causing the seed to be discharged from the hopper, when the seed disk is rotated. The hopper 12 is carried directly above the discharge opening 13, and this opening 13 terminates in an outwardly beveled aperture 13$^a$ for allowing the seed to pass thereunder (Fig. 7) when the pin 10 presses against a seed during the rotation of the seed disk 7; it is to be noted that the frame 4 has an aperture or opening 13 that constitutes a seed discharge opening, which is suitably beveled at 13$^a$, for allowing the pins 10 to pass thereunder and agitate the seed at the lowest end of the hopper, forcing one or more seeds out of the hopper for causing a positive discharge or seeding when the planter is in operation.

In the frame 4, at opposite sides of the discharge opening 13, are threaded vertical apertures 14 (Fig. 2) in which brushes 15 are rotatably mounted. These brushes comprise threaded bodies having stiff bristles at their lower ends, which bristles normally engage the seed disk at opposite sides of the seed discharge opening 13, so as to prevent waste of the seed; the bristles on the adjustable brushes 15 allow ready passage of the pins 10 thereunder. Further, both brushes 15 assist in keeping the edge of disk 7 clean, and each brush will assist in cleaning the pins 10 as they pass through the brush.

The furrow opener device comprises substantially parallel sides 16 formed from a single piece of metal, being integrally connected at their forward ends; each side 16 is outwardly-flared at its lower rear end 17.

The forward end of the furrow opener device serves to open the furrow by cutting into the ground and the furrow is widened by the increased width of the device toward its rear ends, the outwardly-flared portions 17 serving to further open the furrow as the planter moves over the ground, while the furrow opening device is forming the furrow in the ground, the seed disk will be discharging the seed, so that the seed can drop into the furrow as the planter is operated. To support the furrow opening device upon the frame 4 of the planter I fasten two vertical standards 18 between the sides 16, as at 19, and reduced upper ends of these standards 18 are provided with a plurality of alined apertures 20, so that the furrow opener device can be adjusted in the slots or apertures 21 formed in frame 4, as shown by dotted line 22, Fig. 2. Removable fastening pins 23 are used to fasten the standards 18 in the apertures 21.

I have provided a marker device on my planter which comprises a marker bar 24 laid across the side bars 1 and in engagement with the front edge of the board 3. The bar is notched at 25, on its front edge, and in one of the notches is placed the loop 26 of the marker 27. By moving the marker along the bar, placing the loop 26 in different notches, different width rows may be designated. A pair of locking devices 28 is provided for holding the bar 24 in position, each device 28, comprising the body 29 having a rearwardly-extending over-hanging portion or extension 30. Through the body 29 extends a screw 31 that pivotally secures the device 28 upon the side bar 1. The extension 30 overhangs the bar 24, but by reason of the body 29 being rounded or beveled at 31, the locking device can be swung outwardly to permit removal of the bar 24; however, by only one edge of the body 29 being beveled the inward pivotal movement of the device 28 is limited; the limit of movement being the position shown in Figs. 1 and 5.

While I have described the preferred forms of my improvements in a planter, I wish it to be understood that certain minor alterations, or changes may appear to one skilled in the art to which this invention relates, and I, therefore, reserve the right to make such minor alterations or changes as fairly fall within the scope of the appended claim.

What I claim is:

In a planter, the combination of a frame provided with a seed discharge opening, a rotatable disk under said discharge opening provided with spring-pressed plunger pins projecting beyond the face of the disk and into the discharge opening, said discharge opening provided with lower beveled end-faces to permit the pins to ride easily over the same, said frame provided with vertical, threaded apertures opening at their upper ends upon the top of the frame and opening at their lower ends upon said disk, said apertures positioned at opposite sides of the discharge opening, brushes threaded into said apertures and adjustable therein with respect to said disk, and said pins adapted to force the seed from the discharge opening under a beveled face of the frame and through a portion of one brush, substantially as shown and described.

In testimony whereof I hereunto affix my signature.

JOHN T. GERMAIN.